United States Patent
Cai (10) Patent No.: US 8,295,713 B2
(45) Date of Patent: Oct. 23, 2012

(54) DUAL STAGE CARRIER PHASE ESTIMATION IN A COHERENT OPTICAL SIGNAL RECEIVER

(75) Inventor: Yi Cai, Eatontown, NJ (US)

(73) Assignee: Tyco Electronics Subsea Communications LLC, Morristown, NJ (US)

( * ) Notice: Subject to any disclaimer, the term of this patent is extended or adjusted under 35 U.S.C. 154(b) by 181 days.

(21) Appl. No.: 12/718,124

(22) Filed: Mar. 5, 2010

(65) Prior Publication Data

US 2010/0232788 A1  Sep. 16, 2010

Related U.S. Application Data

(60) Provisional application No. 61/159,018, filed on Mar. 10, 2009, provisional application No. 61/159,011, filed on Mar. 10, 2009.

(51) Int. Cl.
H04B 10/00 (2006.01)
H04B 10/06 (2006.01)

(52) U.S. Cl. ......... 398/208; 398/154; 398/158; 398/162

(58) Field of Classification Search ............. 398/25, 398/33, 154, 158, 159, 162, 208
See application file for complete search history.

(56) References Cited

U.S. PATENT DOCUMENTS

| | | | |
|---|---|---|---|
| 4,262,360 A | 4/1981 | Bigo et al. | |
| 5,049,830 A | 9/1991 | Yoshida | |
| 6,052,412 A | 4/2000 | Ruether et al. | |
| 6,560,303 B1 | 5/2003 | Fan et al. | |
| 7,031,405 B1 | 4/2006 | Touzni et al. | |
| 7,486,893 B1 | 2/2009 | Pepper et al. | |
| 2004/0197103 A1 | 10/2004 | Roberts et al. | |
| 2004/0208613 A1 | 10/2004 | Sinha et al. | |
| 2005/0147415 A1 | 7/2005 | Fee et al. | |
| 2005/0169412 A1 | 8/2005 | Yang et al. | |
| 2005/0244164 A1 | 11/2005 | Miyashita et al. | |
| 2006/0132789 A1 | 6/2006 | Davidson et al. | |
| 2006/0291550 A1 | 12/2006 | Wang et al. | |
| 2007/0002982 A1 | 1/2007 | Heikkila | |
| 2007/0092260 A1 | 4/2007 | Bontu et al. | |
| 2007/0149135 A1 | 6/2007 | Larsson et al. | |
| 2007/0222654 A1 | 9/2007 | Vrazel et al. | |
| 2007/0300119 A1 | 12/2007 | Hidaka | |
| 2008/0025733 A1 | 1/2008 | Nazarathy et al. | |
| 2008/0205905 A1* | 8/2008 | Tao et al. ................. | 398/204 |
| 2008/0240224 A1 | 10/2008 | Carballo et al. | |

(Continued)

OTHER PUBLICATIONS

Li, Recent advances in coherent optical communication, Advances in Optics and Photonics 1,279?307 [online], Feb. 11, 2009 [retrieved on Apr. 15, 2010],Retrieved from the Internet:<URL:http://ofc.optics.ucf.edu/research/Recent%20advances%20in%20coherent%20optical%20communication.pdf.

(Continued)

*Primary Examiner* — Dalzid Singh
(74) *Attorney, Agent, or Firm* — Grossman, Tucker, Perreault & Pfleger, PLLC (57) ABSTRACT

A system and method implementing dual stage carrier phase estimation (CPE) in a coherent receiver for an optical fiber communication system. In the first stage, a feed-forward CPE is implemented to make an initial carrier phase estimation of a training sequence. The initial carrier phase estimation is coupled to the second stage which implements a decision-feedback CPE. After a training period, accurate bit decision for system traffic can be achieved using the decision-feedback CPE.

22 Claims, 5 Drawing Sheets

U.S. PATENT DOCUMENTS

| | | |
|---|---|---|
| 2008/0267638 A1 | 10/2008 | Nakashima et al. |
| 2009/0033418 A1 | 2/2009 | Ericson et al. |
| 2009/0047030 A1 | 2/2009 | Hoshida |

OTHER PUBLICATIONS

Liu, Digital self-coherent detection, Optics Express vol. 16, No, 2 [online], Jan. 21, 2008 [retrieved on Apr. 15, 2010], Retrieved from the Internet<URL: http://www.opticsinfobase.org/view_article,cfm?gotourl=http%3A%2F%2Fwww%2Eopticsinfobase%2Eorg%2FDirectPDFAccess%2F03E36195%2DBD9%D137E%2DC6C65EC37B7F62E9%5F148802%2Epdf%3Fda%3D1%26id%3D148802%26seq%DO&org=.

Noe, "PLL-Free Synchronous QPSK Polarization Multiplex/Diversity Receiver Concept With Digital I&Q Baseband Processing," IEEE Photonics Technology Letters, vol. 17, No. 4, pp. 887-889 (Apr. 2005).

Ly-Gagnon et al.., "Coherent Detection of Optical Quadrature Phase-Shift Keying Signals With Carrier Phase Estimation," Journal of Lightwave Technology, vol. 24, No. 1, pp. 12-21 (Jan. 2006).

Cai, et al., "Comparison of Two Carrier Phase Estimation Schemes in Optical Coherent Detection Systems," Optical Fiber Communication and the National Fiber Optic Engineers Conference, 2007, pp. 1-3 (Mar. 2007).

International Search Report and Written Opinion dated Apr. 27, 2010 issued in related International Patent Application No. PCT/US10/26504.

Cai, On Performance of Coherent Phase-Shift-Keying Modulation in 40 Gb/s Long-Haul Optical Fiber Transmission Systems, Optical Fiber Communication and the National Fiber Optic Engineers Conference, Mar. 2006, 3 pages, paper JThB11.

Ho, Electronic Compensation Technique to Mitigate Nonlinear Phase Noise, Journal of Lightwave Technology, Mar. 2004, pp. 779-783, vol. 22, No. 3.

International Search Report and Written Opinion dated Apr. 28, 2010 issued in PCT Patent Application No. PCT/US10/26508, 11 pages.

International Search Report and Written Opinion dated May 4, 2010 issued in PCT Patent Application no. PCT/US10/26511, 10 pages.

Ip et al., Compensation of Dispersion and Nonlinearity in WDM Transmission using Simplified Digital Backpropagation, IEEE, 2008, pp. 123-124.

Kikuchi, Electronic Post-compensation for Nonlinear Phase Fluctuation in a 1000-km 20-Gbit/s Optical Quadrature Phase-shift Keying Transmission System Using the Digital Coherent Receiver, Optics Express, Jan. 21, 2008, pp. 889-896, vol. 16, No. 2.

Li et al., Electronic post-compensation of WDM transmission impairments using coherent detection and digital signal processing, Optics Express, Jan. 21, 2008, pp. 880-888, vol. 16, No. 2.

International Search Report and Written Opinion dated May 12, 2010 issued in PCT Patent Application No. PCT/US10/26513, 10 pages.

\* cited by examiner

DUAL STAGE CARRIER PHASE ESTIMATION IN A COHERENT OPTICAL SIGNAL RECEIVER

CROSS-REFERENCE TO RELATED APPLICATIONS

The present application claims the benefit of U.S. Provisional Patent Application Ser. No. 61/159,018, filed on Mar. 10, 2009, and U.S. Provisional Patent Application Ser. No. 61/159,011, filed on Mar. 10, 2009, which are fully incorporated herein by reference.

TECHNICAL FIELD

The present application relates to the optical transmission of information and, more particularly, to dual stage carrier phase estimation in a coherent optical signal receiver.

BACKGROUND

Signals may be used to transmit data over distances. In optical communication systems, for example, data may be modulated on one or more optical wavelengths to produce modulated optical signals that may be transmitted over optical waveguides such as optical fibers. One modulation scheme that may be used in optical communication systems is phase shift keying (PSK) in which data is transmitted by modulating the phase of an optical wavelength such that the phase or phase transition of the optical wavelength represents symbols encoding one or more bits. A variety of PSK modulation formats are well known. In a binary phase-shift keying (BPSK) format, for example, two phases may be used to represent 1 bit per symbol. PSK formats also include differential phase-shift-keying (DPSK) formats. In a DPSK format, the optical intensity of the signal may be held constant while ones and zeros are indicated by differential phase transitions. DPSK modulation formats include return-to-zero differential phase-shift keying (RZ-DPSK), wherein a return-to-zero amplitude modulation is imparted to a DPSK signal, and chirped return-to-zero differential phase-shift keying (CRZ-DPSK).

PSK formats include a number of known multi-level modulation formats wherein multiple data bits may be encoded on a single transmitted symbol. Examples of multi-level PSK modulation formats useful for encoding two-bits per symbol include: quadrature phase shift keying (QPSK); differential quadrature phase shift keying (DQPSK) wherein information is encoded in four differential phases; and a combination of amplitude shift keying and differential binary phase shift keying (ASK-DBPSK). Multi-level modulation formats with eight symbol levels useful for encoding three bits per symbol include differential 8-level phase shift keying (D8PSK) and ASK-DQPSK. A combination of quadrature amplitude shift keying and differential quadrature phase modulation (QASK-DQPSK) may be used to provide 16 symbol levels, or four bits per symbol. Another alternative modulation format is, namely, quadrature amplitude modulation (QAM), in which information is modulated onto both phase and amplitude of a transmitted signal. For simplicity and ease of explanation, the term "PSK modulation format" refers to any modulation format wherein data is encoded at least in part in the phase of an optical signal, including, but not limited to any of the modulation formats described above.

Since data is encoded in the phase of an optical signal in systems implemented using PSK modulation formats, such systems may include coherent receivers for demodulating the signals. Digital signal processing (DSP) may be implemented in such systems for processing the received signals to provide demodulated data. Digital signal processing of the received signals provides speed and flexibility and may be used to perform a variety of functions including estimation of the carrier phase of the received signals and data detection using the estimated carrier phase. Known methods of implementing carrier phase estimation in a DSP-based coherent receiver have induced unacceptable performance penalties or have required an unacceptably slow initial training period.

BRIEF DESCRIPTION OF THE DRAWINGS

Reference should be made to the following detailed description which should be read in conjunction with the following figures, wherein like numerals represent like parts.

DETAILED DESCRIPTION

In general, a system consistent with the present disclosure implements dual stage carrier phase estimation (CPE). In the first stage, a feed forward CPE is implemented to make an initial carrier phase estimation of a training sequence, such as a pseudo-random bit sequence (PRBS). The initial carrier phase estimation is coupled to the second stage which implements a decision feedback CPE. After a training period, accurate bit decision for system traffic can be achieved using the decision feedback CPE.

Figure 1:
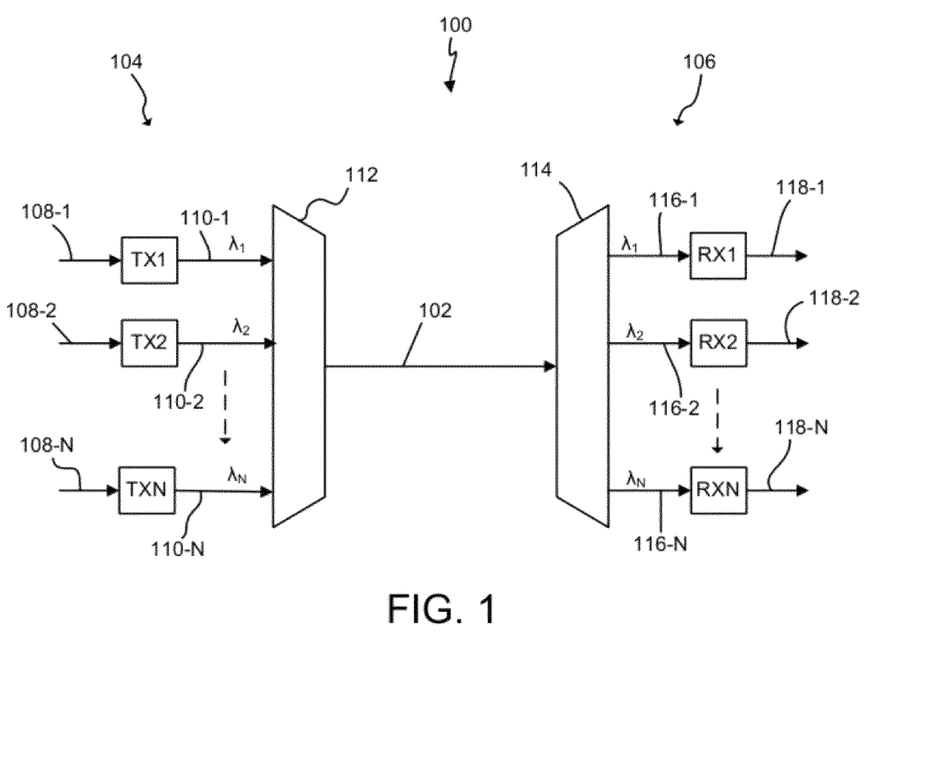
FIG. 1 is a block diagram of one exemplary embodiment of a system consistent with the present disclosure.

FIG. 1 is a simplified block diagram of one exemplary embodiment of a WDM transmission system 100 consistent with the present disclosure. The transmission system serves to transmit a plurality of optical channels over an optical information path 102 from a transmitting terminal 104 to one or more remotely located receiving terminals 106. The exemplary system 100 may be a long-haul submarine system configured for transmitting the channels from a transmitter to a receiver at a distance of 5,000 km, or more. Although exemplary embodiments are described in the context of an optical system and are useful in connection with a long-haul WDM optical system, the broad concepts discussed herein may be implemented in other communication systems transmitting and receiving other types of signals.

Those skilled in the art will recognize that the system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXN receives a data signal on an associated input port 108-1, 108-2 . . . 108-N, and transmits the data signal on associated wavelength $\lambda_1, \lambda_2 \ldots \lambda_N$. One or more of the transmitters TX1, TX2 . . . TXN may be configured to modulate data on the associated wavelength with using a PSK modulation format, such as DBPSK, DQPSK, RZ-DPSK, RZ-DQPSK, etc. The transmitters, of course, are shown in highly simplified form for ease of explanation. Those skilled in the art will recognize that each transmitter may include electrical and optical components configured for transmitting the data signal at its associated wavelength with a desired amplitude and modulation.

The transmitted wavelengths or channels are respectively carried on a plurality of paths 110-1, 110-2 . . . 110-N. The data channels are combined into an aggregate signal on optical path 102 by a multiplexer or combiner 112. The optical information path 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_1, \lambda_2 \ldots \lambda_N$ onto associated paths 116-1, 116-2 . . . 116-N coupled to associated receivers RX1, RX2 . . . RXN. One or more of the receivers RX1, RX2 . . . RXN may be configured to demodulate the transmitted signal and provide an associated output data signal on an associated output path 118-1, 118-2, 118-3, 118-N. The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

Figure 2:
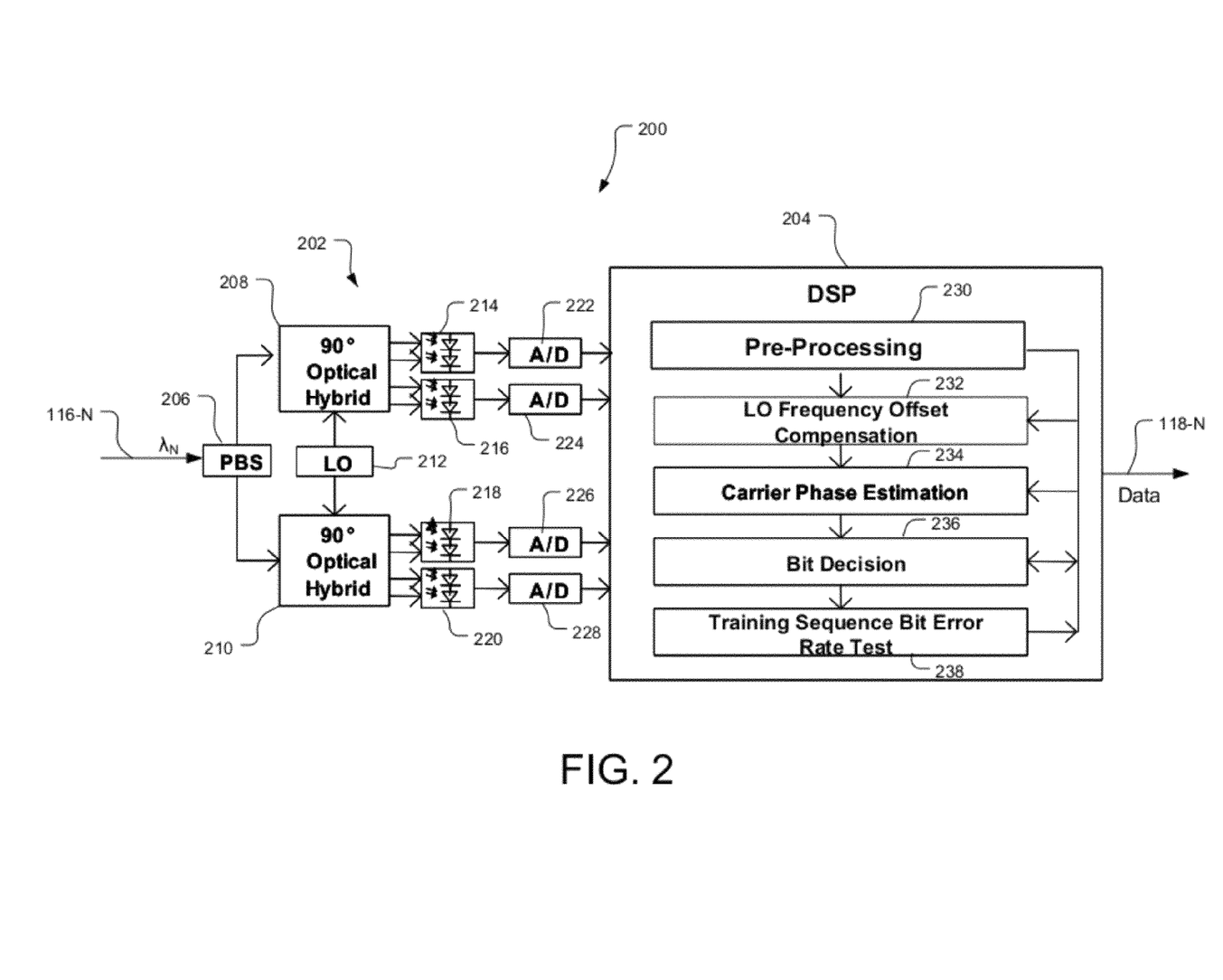
FIG. 2 is a block diagram of one exemplary embodiment of a receiver consistent with the present disclosure.

FIG. 2 is a simplified block diagram of one exemplary receiver 200 consistent with the present disclosure. The illustrated exemplary embodiment 200 includes a coherent receiver configuration 202 for receiving an input signal on path 116-N and a digital signal processing (DSP) circuit 204 for processing the output of the coherent receiver to provide an output data signal on path 118-N. Data is modulated on the carrier wavelength $\lambda_N$ of the optical input signal according to a PSK modulation format. The coherent receiver 202 converts the received optical input signal into one or more digital signals that are coupled as inputs to the DSP circuit 204. The DSP circuit demodulates the data from the digital signals to provide an output data stream on path 118-N representative of the data modulated on the carrier wavelength $X_N$.

The coherent receiver 202 may take a variety of configurations. In the illustrated exemplary embodiment, the receiver includes a polarization beam splitter (PBS) 206, first and second 90° optical hybrids 208, 210, a local oscillator (LO) 212, balanced detectors 214, 216, 218, 220 and analog-to-digital (A/D) converters 222, 224, 226, 228. The operations of these components in a coherent optical signal receiver are briefly described as follows. In general, different polarizations of the input optical signal are split onto separate paths by the PBS 206. Each polarization is coupled to an associated 90° optical hybrid 208, 210. Each optical hybrid mixes its input signal with the four quadrilateral states of the LO oscillator signal in the complex-field space. Each optical hybrid then delivers the four mixed signals to two pairs of balanced detectors 214, 216, 218, 220. The outputs of the balanced detectors are converted to digital signals by the A/D converters 222, 224, 226, 228.

The digital outputs of the A/D converters are coupled as inputs to the DSP circuit 204. In general, DSP involves processing of signals using one or more application specific integrated circuits (ASICS) and/or special purpose processors configured for performing specific instruction sequences, e.g. directly and/or under the control of software instructions. In the illustrated exemplary embodiment, the DSP circuit 204 is shown as including a pre-processing function 230, an optional local oscillator (LO) frequency offset compensation function 232, a carrier phase estimation function 234, a bit decision function 236 and an optional training sequence bit error rate test function 238. These functions may be implemented in a variety of configurations using any combination of hardware, software and/or firmware. Although the functions are illustrated separately, it is to be understood that any one or more of the functions may be performed in a single integrated circuit or processor, or in a combination of integrated circuits and/or processors. Also, the integrated circuits and/or processors implementing the DSP functions may be shared among the illustrated functions in whole or in part.

The pre-processing function 230 of the DSP may include various optical signal detection functions implemented in different types of DSP-based coherent detection receivers. The pre-processing functions may include, for example, a waveform recovery and alignment function, a deterministic distortion compensation function, a clock recovery function, a synchronized data re-sampling function, and a polarization tracking and polarization mode dispersion (PMD) compensation function. The optional LO frequency offset compensation function 232 may be configured to track and compensate for frequency offset between the received signal and the LO signal.

In general, since the data in a PSK modulated signal is encoded in the phase of an optical carrier signal, demodulation of a PSK modulated signal in a DSP-based receiver involves estimating and tracking the carrier phase. The carrier phase estimation function 234 is provided for this purpose and may be configured as a dual stage carrier phase estimation function consistent with the present disclosure. The carrier phase estimate from the carrier phase estimation function is coupled to a bit decision function 236, which determines the data or bit values represented by the carrier phase in the modulated signal and mitigates the effects of data pattern dependent signal distortion such as phase distortion. The output of the bit decision function may thus be representative of the data modulated on the carrier wavelength 4 and may be coupled on an output on path 118-N. The optional training sequence error rate test function 238 may be configured for performing a bit error rate (BER) test on a training sequence for training the operation of the carrier phase estimation function.

Figure 3:
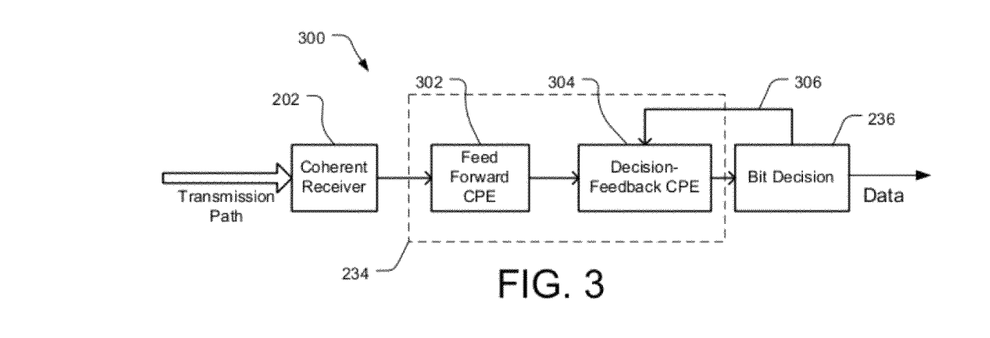
FIG. 3 is a block diagram of one exemplary embodiment of a receiver incorporating a dual stage carrier phase estimation function consistent with the present disclosure.

FIG. 3 is a simplified block diagram of one exemplary embodiment 300 of a receiver incorporating a dual stage carrier phase estimation function 234 consistent with the present disclosure. The illustrated exemplary embodiment includes a coherent receiver 202 for receiving an optical signal having data modulated on a carrier wavelength according to a PSK modulation format. The output of the receiver 202 may be coupled to a feed forward CPE function 302 for providing an initial carrier phase estimation to a decision feedback CPE function 304. Feed forward CPE functions for estimating the carrier phase of a signal include, for example, a Costas loop function, an average phase function, and an Mth power scheme. Examples of coherent receiver configurations using Mth power schemes for feed forward CPE are described in Ly-Gagnon et al., "Coherent Detection of Optical Quadrature Phase-Shift Keying Signals With Carrier Phase Estimation," Journal of Lightwave Technology, Vol. 24, No. 1, pp. 12-21 (January 2006) and in R. Noé, "PLL-Free Synchronous QPSK Polarization Multiplex/Diversity Receiver Concept With Digital I&Q Baseband Processing," IEEE Photonics Technology Letters, Vol. 17, No. 4, pp. 887-889 (April 2005), which are fully incorporated herein by reference. A description and comparison of Mth power and decision feedback CPE schemes for use in a DSP-based coherent receiver are provided in Yi Cai and Alexei N. Pilipetskii, "Comparison of Two Carrier Phase Estimation Schemes in Optical Coherent Detection Systems," Optical Fiber Communication and the National Fiber Optic Engineers Conference, 2007, pages 1-3 (March 2007), the teachings of which are fully incorporated herein by reference.

The output of the decision feedback CPE function 304 may be an operational CPE coupled to a bit decision function 236. The bit decision function 236 may use the operational CPE to determine the data or bit values represented by the carrier phase in the modulated signal and provide an output representative of the data modulated on the carrier wavelength. The bit decision function 236 may provide feedback 306 to the decision feedback CPE function 304 for performing a decision feedback CPE. In operation, the initial stage feed forward CPE function provides an initial CPE that establishes a decision accuracy sufficient for allowing operation of the decision feedback CPE function when it is impractical to use a decision feedback CPE function alone due to insufficient decision accuracy.

Figure 4:
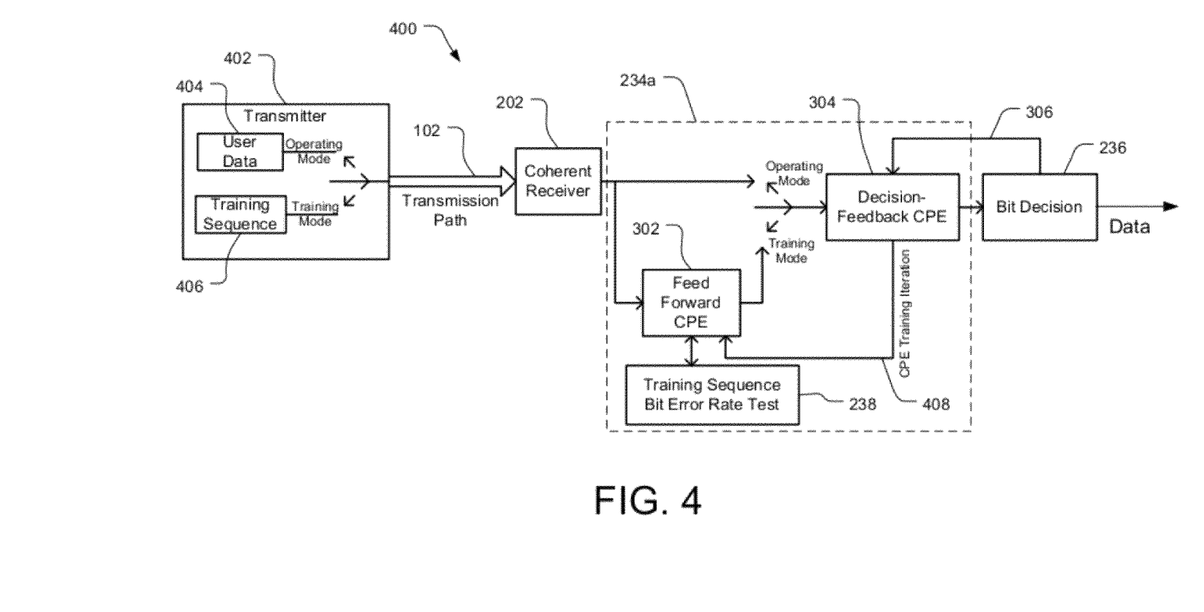
FIG. 4 is a block diagram of an exemplary optical communication system incorporating a dual stage carrier phase estimation function consistent with the present disclosure.

FIG. 4 is a simplified block diagram of an exemplary optical communication system 400 incorporating a dual stage carrier phase estimation function 234a consistent with the present disclosure. For simplicity and ease of explanation, the system is shown including only a single coherent receiver 202 for receiving only a single wavelength. It is to be understood that the system may be configured as a WDM system including a demultiplexer and a plurality of receivers for receiving multiple wavelengths.

The illustrated exemplary embodiment includes a transmitter 402 configured for selectively transmitting user data 404 in an operating mode, or a training sequence 406, e.g. a PRBS, in a training mode. The output of the transmitter is coupled on an optical transmission path 102 to the coherent receiver 202. The output of the receiver 202 may be coupled to the dual stage carrier phase estimation function 234a consistent with the present disclosure. The dual stage carrier phase estimation function 234a includes a feed forward CPE function 302 and a decision feedback CPE function 304. A training sequence bit error rate function 238 may be coupled to the feed forward CPE function 302 to assist in establishing an initial CPE output from the feed forward CPE function.

In a training mode, the transmitter 402 transmits the training sequence and is coupled to the feed forward CPE function 302. The CPE established by the feed forward CPE function 302 may be coupled to the training sequence bit error rate test function 238, which may apply the CPE to determine whether the training sequence can be synchronized using the CPE. In one embodiment, for example, any phase ambiguity from the feed forward CPE may be eliminated by rotating through possible phase rotation values associated with samples of the training sequence signal and attempting to obtain a training sequence synchronization using the training sequence error rate tester 238. The feed forward CPE function 302 may not provide an initial CPE to the decision feedback CPE function 304 until the training sequence bit error rate test function 238 can synchronize the training sequence using the CPE from the feed forward CPE.

The initial CPE from the feed forward CPE function 302 is coupled to the decision feedback CPE 304. The output of the decision feedback CPE function 304 may be an operational CPE coupled to a bit decision function 236. The bit decision function 236 may use the operational CPE to determine the data or bit values represented by the carrier phase in the modulated signal and provide an output representative of the data modulated on the carrier wavelength. The bit decision function 236 may also provide feedback 306 to the decision feedback CPE function 304 for performing a decision feedback CPE. Optional iterative training may be achieved by providing feedback 408 from the decision feedback CPE function 304 to the feed forward CPE function 302.

The combination of the training sequence 406 from the transmitter, the feed forward CPE function 302 and the decision feedback CPE function 304 allows a fast, practical and accurate carrier phase estimation. The training sequence may be used to quickly eliminate any phase ambiguity resulting from the feed forward CPE and eliminates the need for differential coding for operation of the feed forward CPE and the corresponding performance penalty. The initial CPE established by the feed forward CPE function establishes decision accuracy sufficient for allowing operation of the decision feedback CPE function when it is impractical to use a decision feedback CPE function alone due to insufficient decision accuracy.

Once the training mode is complete, the system may enter an operating mode whereby the transmitter 402 may transmit user data 404 on the transmission path. In the operating mode, the output of the coherent receiver 202 may be coupled to the decision feedback CPE function 304 and may bypass the feed forward CPE function 302. The training mode may, however, be run periodically to keep the carrier phase estimation on track.

Figure 5:
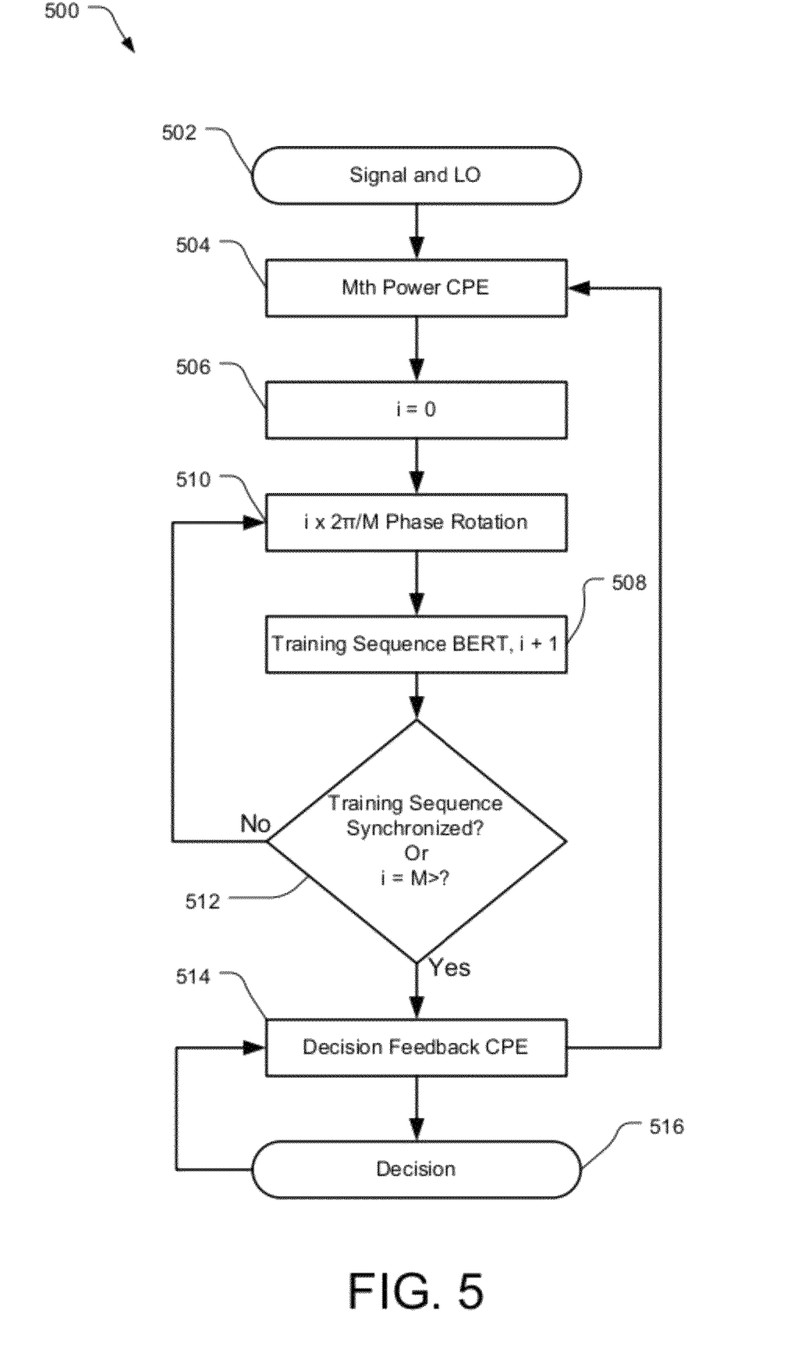
FIG. 5 is a flow chart illustrating an exemplary dual stage carrier phase estimation process consistent with the present disclosure.

FIG. 5 is a flow chart of one exemplary dual stage CPE process 500 consistent with the present disclosure. The flow charts used herein to describe various embodiments include a particular sequences of steps. It can be appreciated, however, that the sequence of steps merely provides an example of how the general functionality described herein can be implemented. Further, each sequence of steps does not have to be executed in the order presented unless otherwise indicated.

Also, the illustrated exemplary embodiment utilizes an Mth power scheme as a feed forward CPE function. In general, an Mth power scheme estimates the phase of a current symbol of an M-ary (i.e. M=2 for BPSK, M=4 for QPSK, etc.) PSK formatted signal by averaging over N neighbor symbols the signal samples of which are raised to the Mth power. It is to be understood, however, that a system or method consistent with the present disclosure is not limited to any specific feed forward CPE.

In the exemplary embodiment of FIG. 5, the signal and local oscillator (LO) signals are coupled 502 to an Mth power CPE function. Initially, the Mth power CPE function establishes 504 a CPE with an M-fold phase ambiguity (e.g., $CPE_M$). For an M-PSK format, after the CPE is determined by the Mth power scheme, the signal sample constellation may be rotated (e.g., 0, $2\pi/M$, $4\pi/M$, $6\pi/M$, ...) to eliminate this phase ambiguity. To determine the correct phase rotation value, a training sequence may be used and all possible M ambiguity values may be used in a training sequence bit error rate tester (e.g., using test function 238) until a training sequence synchronization is achieved.

According to the exemplary training process in the illustrated embodiment, a counter "i" is initialized to zero 506, phase rotations are performed 510 for training sequence signal samples, and a training sequence bit error rate test is performed 508 to determine synchronization. The training sequence may be tested until the training sequence is synchronized or the number of rotations equals the number (M) of possible ambiguity values (e.g., i=M) 512. When synchronization has been achieved in the training sequence, the Mth power CPE plus the phase rotation value that allowed synchronization is considered the best initial CPE (e.g., $CPE=CPE_M+i*2\pi/M$). That initial CPE is passed on to the decision feedback CPE function 514, which provides an operational CPE to a bit decision function 516 based on bit decision feedback. Although the illustrated exemplary embodiment shows a phase rotation of $i*2\pi/M$, the amount of each phase rotation may be different for different applications and is not a limitation.

The resulting operational CPE from the decision feedback CPE may be sent back to the Mth power CPE function to establish an iterative training loop. The number of iterations between the M-th power CPE training function and the decision-feedback CPE function may be different for different applications. Once a satisfactory CPE is established, the dual stage CPE can exit the training mode to process user data, e.g. using only the decision feedback CPE function.

Figure 6:
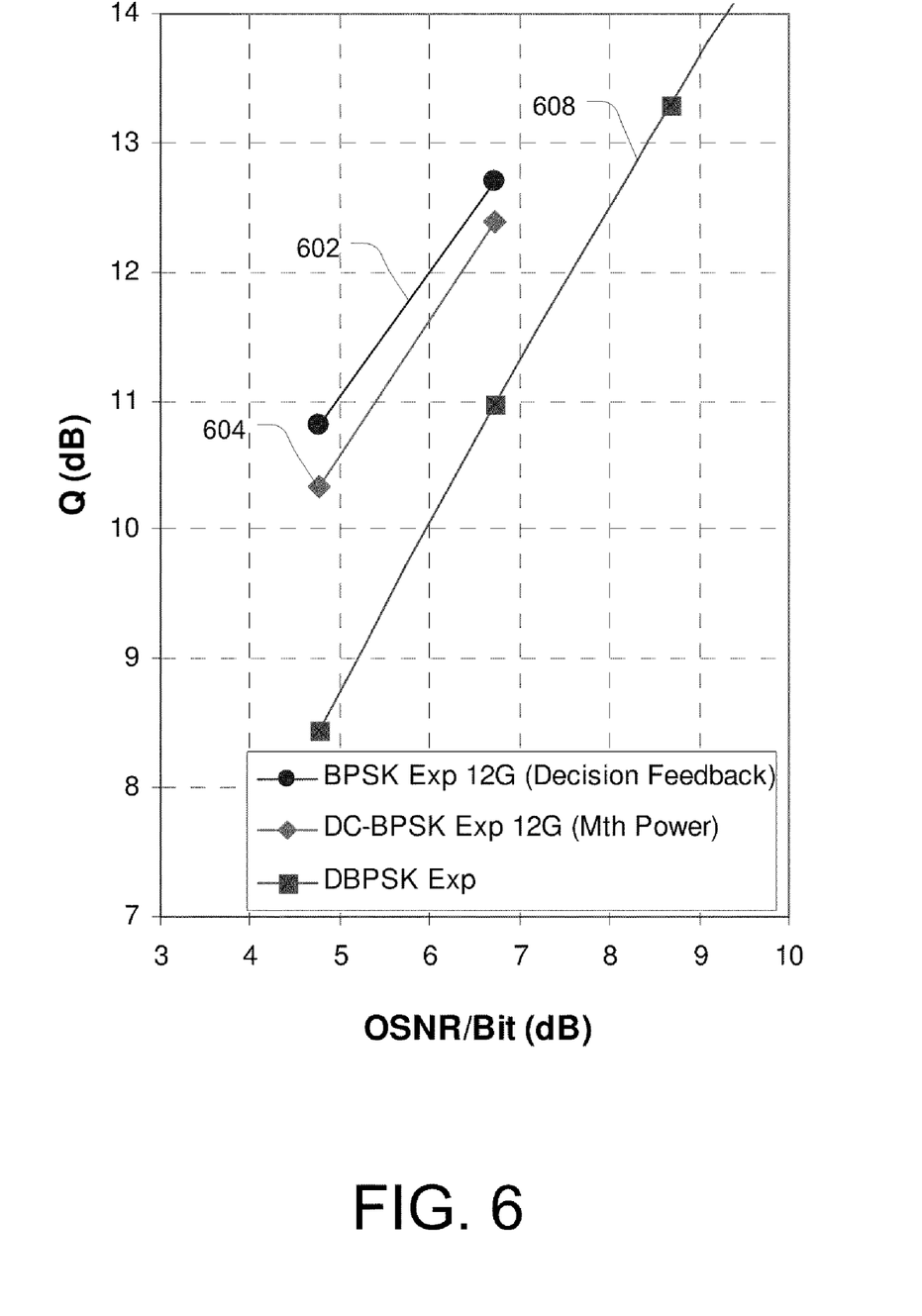
FIG. 6 includes plots of Q-factor vs. optical signal-to-noise ratio illustrating performance of an embodiment consistent with the present disclosure.

FIG. 6 includes plots 602, 604, 606 of Q-factor vs. optical signal-to-noise ratio illustrating performance of a system consistent with the present disclosure in a WDM back to back noise loading experiment using a coherent receiver including a dual stage CPE function consistent with the present disclosure. As shown in plot 602 and 604, after the dual-stage training described above, the decision feedback CPE alone in the operating mode provides improved performance over use of an Mth power scheme alone. However, as described above, using a feed forward scheme such as an Mth power scheme allows a fast and accurate decision feedback CPE when it is impractical to use a decision feedback CPE function alone due to insufficient decision accuracy. As shown, in plot 608, for example, excellent Q performance may be achieved using a dual stage CPE function consistent with the present disclosure.

According to one aspect of the disclosure there is thus provided a system for estimating the phase of a signal having data modulated thereon according to a phase shift keying modulation format, the system including: a digital signal processor (DSP) configured to receive the electrical signal, to perform a feed forward carrier phase estimation function to provide an initial carrier phase estimation, and to perform a decision feedback carrier phase estimation function to provide an operational carrier phase estimation in response to feedback from a bit decision function. The bit decision function may be configured to determine data values from the signal in response to the operational carrier phase estimation to provide an output representative of the data modulated on the signal.

According to another aspect of the disclosure, there is provided an optical communication system including: a transmitting terminal for transmitting a plurality of optical signals, each at a different associated wavelength, on an optical information channel, at least one of the optical signals being a phase shift keying (PSK) signal having data modulated thereon according to a phase shift keying modulation format, a receiving terminal coupled to the optical information path for receiving at least one of the plurality of optical signals, the receiving terminal including: an optical signal receiver for receiving the PSK signal and providing at least one electrical signal representative of the PSK signal; and a digital signal processor (DSP) configured to receive the electrical signal, to perform a feed forward carrier phase estimation function to provide an initial carrier phase estimation, and to perform a decision feedback carrier phase estimation function to provide an operational carrier phase estimation in response to feed back from a bit decision function, the bit decision function configured to determine data values from the electrical signal in response to the operational carrier phase estimation to provide an output representative of the data modulated on the PSK signal.

According to another aspect of the disclosure, there is provided a detection method for demodulating an optical signal having data modulated thereon according to a phase shift keying modulation format, the method including converting the optical signal into at least one electrical signal representative of the optical signal; performing a feed forward carrier phase estimation function to provide an initial carrier phase estimation associated with the optical signal; performing a decision feedback carrier phase estimation function using the initial carrier phase estimation and provide an operational carrier phase estimation associated with the optical signal in response to feedback from a bit decision function; and performing a bit decision function to determine data values from the electrical signal in response to the operational carrier phase estimation to provide an output representative of the data modulated on the optical signal.

According to another aspect of the disclosure, there is provided a method of training a decision feedback carrier phase estimation function in a digital signal processing (DSP) based optical signal receiver, the method including: transmitting an optical signal to the receiver, the optical signal having a training sequence modulated thereon according to a phase shift keying modulation format; converting the optical signal into at least one electrical signal representative of the optical signal; performing a feed forward carrier phase estimation function to provide an initial carrier phase estimation associated with the optical signal; performing a training sequence bit error rate test function to attempt to synchronize the training sequence using the initial carrier phase estimation; providing the initial carrier phase estimation to the decision feedback carrier phase estimation function if the training sequence bit error rate test function synchronizes the training sequence; and performing the decision feedback carrier phase estimation function using the initial carrier phase estimation and provide an operational carrier phase estimation associated with the optical signal in response to feedback from a bit decision function.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system for estimating a phase of an optical signal having data modulated thereon according to a phase shift keying modulation format, the system comprising:

an optical signal receiver for receiving said optical signal and providing at least one electrical signal representative of said optical signal; and a digital signal processor (DSP) configured to receive said electrical signal, to perform a feed forward carrier phase estimation function to provide an initial carrier phase estimation, and to perform a decision feedback carrier phase estimation function using said initial carrier phase estimation to provide an operational carrier phase estimation in response to feed back from a bit decision function, said bit decision function configured to determine data values from said electrical signal in response to said operational carrier phase estimation to provide an output representative of the data modulated on said optical signal.

2. A system according to claim 1, wherein said feed forward carrier phase estimation function uses an Mth power scheme.

3. A system according to claim 1, wherein said optical signal comprises a training sequence in a training mode of said system, and wherein said DSP is configured to perform a training sequence bit error rate test function, said training sequence bit error rate test function being configured to attempt synchronization of said training sequence using a carrier phase estimation provided by said feed forward carrier phase estimation function.

4. A system according to claim 3, wherein said feed forward carrier phase estimation function is configured to provide said initial carrier phase estimation only after said training sequence is synchronized in said training sequence bit error rate test function.

5. A system according to claim 3, wherein said training sequence comprises a pseudo random bit sequence.

6. A system according to claim 1, wherein said system is configured to enter an operating mode after said initial carrier phase estimation is provided to said decision feedback carrier phase estimation function, wherein said optical signal comprises user data, and wherein said DSP is configured to provide said electrical signal to said decision feedback carrier phase estimation function during said operating mode by bypassing said feed forward carrier phase estimation function.

7. A optical communication system comprising:
a transmitting terminal for transmitting a plurality of optical signals, each at a different associated wavelength, on an optical information path, at least one of said optical signals being a phase shift keying (PSK) signal having data modulated thereon according to a phase shift keying modulation format;
a receiving terminal coupled to said optical information path for receiving at least one of said plurality of optical signals, said receiving terminal comprising:
an optical signal receiver for receiving said PSK signal and providing at least one electrical signal representative of said PSK signal; and
a digital signal processor (DSP) configured to receive said electrical signal, to perform a feed forward carrier phase estimation function configured to provide an initial carrier phase estimation, and to perform a decision feedback carrier phase estimation function using said initial carrier phase estimation to provide an operational carrier phase estimation in response to feed back from a bit decision function, said bit decision function configured to determine data values from said electrical signal in response to said operational carrier phase estimation to provide an output representative of the data modulated on said PSK signal.

8. A system according to claim 7, wherein said feed forward carrier phase estimation function uses an Mth power scheme.

9. A system according to claim 7, wherein said PSK signal comprises a training sequence in a training mode of said system, and wherein said DSP is configured to perform a training sequence bit error rate test function, said training sequence bit error rate test function being configured to attempt synchronization of said training sequence using a carrier phase estimation provided by said feed forward carrier phase estimation function.

10. A system according to claim 9, wherein said feed forward carrier phase estimation function is configured to provide said initial carrier phase estimation only after said training sequence is synchronized in said training sequence bit error rate test function.

11. A system according to claim 9, wherein said training sequence comprises a pseudo random bit sequence.

12. A system according to claim 9, wherein said system is configured to enter an operating mode after said initial carrier phase estimation function is provided to said decision feedback carrier phase estimation function, wherein said PSK signal comprises user data and said DSP is configured to provide said electrical signal to said decision feedback carrier phase estimation function during said operating mode by bypassing said feed forward carrier phase estimation function.

13. A detection method for demodulating an optical signal having data modulated thereon according to a phase shift keying modulation format, the method comprising
converting said optical signal into at least one electrical signal representative of said optical signal;
performing a feed forward carrier phase estimation function to provide an initial carrier phase estimation associated with said optical signal;
performing a decision feedback carrier phase estimation function using said initial carrier phase estimation to provide an operational carrier phase estimation associated with said optical signal in response to feedback from a bit decision function; and
performing the bit decision function to determine data values from said electrical signal in response to said operational carrier phase estimation to provide an output representative of the data modulated on said optical signal.

14. A method according to claim 13, wherein said feed forward carrier phase estimation function uses an Mth power scheme.

15. A method according to claim 13, wherein said optical signal comprises a training sequence in a training mode of said system, and wherein said method further comprises performing a training sequence bit error rate test function to attempt synchronization of said training sequence using a carrier phase estimation provided by said feed forward carrier phase estimation function.

16. A method according to claim 15, wherein said performing said feed forward carrier phase estimation function comprises providing said initial carrier phase estimation only after said training sequence is synchronized using said training sequence bit error rate test function.

17. A method according to claim 15, wherein said training sequence comprises a pseudo random bit sequence.

18. A method according to claim 15, said method comprising entering a operating mode after said initial carrier phase estimation function is provided to said decision feedback carrier phase estimation function, wherein said optical signal comprises user data, and wherein said method comprises providing said electrical signal to said decision feedback carrier phase estimation function during said operating mode by bypassing said feed forward carrier phase estimation function.

19. A method of training a decision feedback carrier phase estimation function in a digital signal processing (DSP) based optical signal receiver, said method comprising:
   transmitting an optical signal to said receiver, said optical signal having a training sequence modulated thereon according to a phase shift keying modulation format;
   converting said optical signal into at least one electrical signal representative of said optical signal;
   performing a feed forward carrier phase estimation function to provide an initial carrier phase estimation associated with said optical signal;
   performing a training sequence bit error rate test function to attempt to synchronize said training sequence using said initial carrier phase estimation;
   providing said initial carrier phase estimation to said decision feedback carrier phase estimation function if said training sequence bit error rate test function synchronizes said training sequence; and
   performing said decision feedback carrier phase estimation function using said initial carrier phase estimation to provide an operational carrier phase estimation associated with said optical signal in response to feedback from a bit decision function.

20. A method according to claim 19, wherein said feed forward carrier phase estimation function uses an Mth power scheme to provide the initial carrier phase estimation.

21. A method according to claim 19, wherein performing said training sequence bit error rate test function includes rotating test sequence signal samples through a plurality of possible phase rotation values until synchronization is achieved.

22. A method according to claim 19, wherein said feed forward carrier phase estimation function uses an Mth power scheme to provide an Mth power carrier phase estimation, wherein performing said training sequence bit error rate test function includes rotating test sequence signal samples through a plurality of possible phase rotation values until synchronization is achieved, and wherein said initial carrier phase estimation includes the Mth power carrier phase plus a phase rotation value that resulted in synchronization.

* * * * *